March 29, 1955

R. B. GRAY 2,705,018

CONTROLS

Filed Feb. 7, 1951

2 Sheets-Sheet 1

Inventor
Robert B Gray
By
Ralph Hammar
Attorney

March 29, 1955

R. B. GRAY 2,705,018

CONTROLS

Filed Feb. 7, 1951

2 Sheets-Sheet 2

United States Patent Office 2,705,018
Patented Mar. 29, 1955

2,705,018

CONTROLS

Robert B. Gray, Erie, Pa., assignor to American Meter Company, Erie, Pa., a corporation of Delaware Application February 7, 1951, Serial No. 209,887

3 Claims. (Cl. 137—86)

In fluid operated control systems it is sometimes desirable to transmit to the controller a transmitted pressure which has a derivative relationship to the quantity to be measured or controlled. It is further desirable that the transmitted pressure have an adjustable derivative relationship to the quantity to be measured both as to time and magnitude so that a single transmitter can be used under a wide variety of conditions and installations. This invention is intended to produce such a result. Further objects and advantages appear in the specification and claims.

Figure 1:
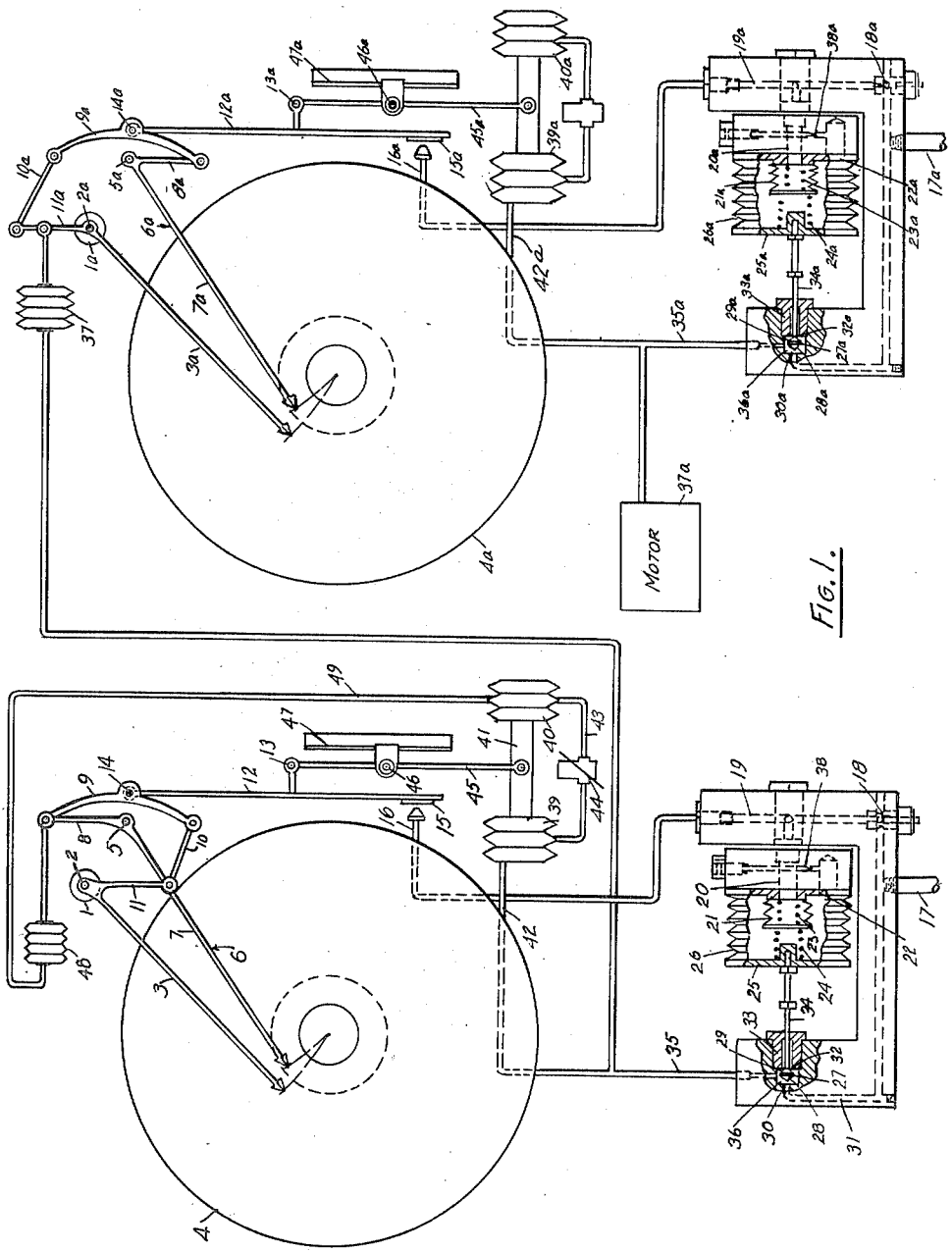
Figure 2:
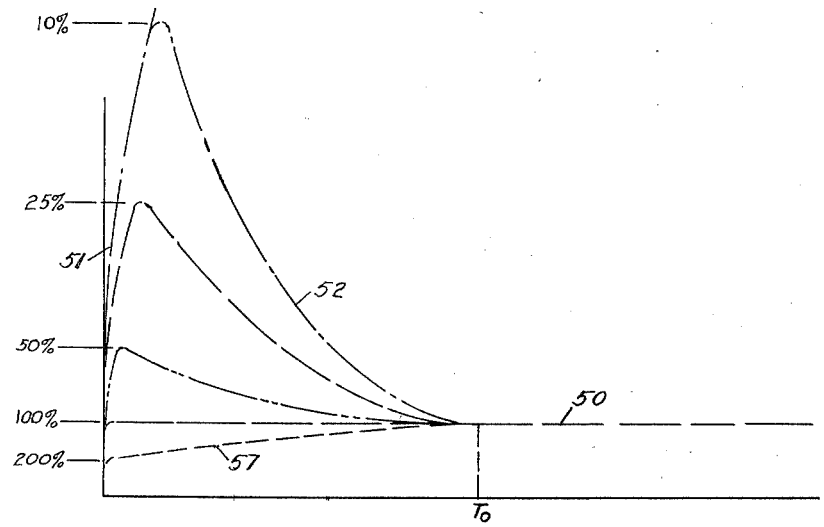
Figure 3:
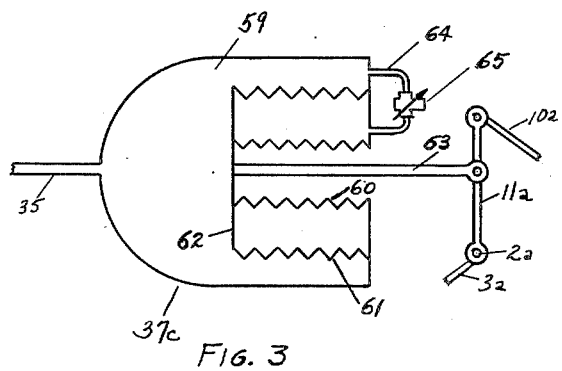

In the drawings, Fig. 1 is a diagrammatic view of a transmitter and controller, Fig. 2 is a family of curves illustrating the range of adjustment of the transmitter, and Fig. 3 is a view of a modification.

Referring to the drawing, 1 indicates a sensitive measuring element for the controlled quantity having a shaft 2 (fixed pivot) carrying a pen arm 3 for a chart 4. At the same radial distance from the center of the chart as the measuring element shaft 2 is a fixed pivot 5 carrying a bell crank reset or follow up lever 6, arm 7 of which serves as a pointer indicating the difference between the transmitter output pressure and the indication of the measuring instrument 1 and the other arm 8 of which is pivoted at one end to a differential lever 9. The opposite end of the differential lever 9 is connected by a link 10 to an arm 11 fixed on the shaft 2. In the balanced or steady state position, the pointer 7 indicates the same value as the pen arm 3 and the differential lever 9 is parallel to the arm 11 and in line through the pivot 5 so the arm 11, link 10, and differential lever 9 for this position form a parallelogram linkage. The parts are illustrated in an off balance position.

Changes in the indication of the instrument 1 cause rotation of the shaft 2 and of the pointer 3 and arm 11 fixed thereto. A movement of the arm 11 is transmitted to the differential lever 9 causing it to pivot about the upper end of the arm 8. The motion of the differential lever 9 is transmitted to a flapper lever 12 pivoted on a pivot 13 and having its upper end pivoted at 14 to the differential lever 9 and its lower end carrying a flapper 15 cooperating with a nozzle 16 supplied from a pneumatic fluid pressure line 17 through a restricted orifice 18 and a passageway 19. The pressure in the passageway 19 varies directly with the position of the flapper, increasing as the flapper approaches and decreasing as the flapper recedes from the nozzle. The orifice 18 so restricts the flow that the variations in pressure in the passageway 19 do not materially vary the quantity of fluid flow.

The variation in the nozzle pressure appearing in the passageway 19 is fed to a continuous bleed type relay, which by way of example is illustrated as the relay shown in my co-pending application Serial No. 108,775. In this relay, the pressure in passageway 19 is fed through a way 20 to the interior of a bellows 21 carried by a rigid wall 22 and loaded by a compression spring 23. The bellows 21 acts through a relatively light coupling spring 24 attached to the free end plate 25 of an enclosing bellows 26 also carried by the rigid wall 22. The end plate 25 carries a valve 27 having oppositely facing conical faces 28 and 29 respectively cooperating with a seat 30 in a way 31 leading from the fluid pressure supply 17 and with a seat 32 on a bushing 33 loosely surrounding the valve stem 34. The valve is moved forward and away from the seat 32 and thereby controls the pressure in line 35 leading from a chamber 36 around the valve seats to a bellows 37 associated with a controller. The bellows 37 moves controller arm 11a and pointer 3a about point 2a in the same manner as the instrument 1 in the transmitter. The controller also has a direct set pointer 7a which indicates the control point to be held. While in some applications, the controller could respond directly to the indication of instrument 1, in the present application it is desirable that the controller respond to the transmitted pressure which, as hereinafter described, is modified so as to have a derivative relation added to the indication of the instrument 1. The manner in which the pressure in bellows 37 is modified so as to have a derivative relation to the indication of the instrument 1 will now be described.

As explained in greater detail in the above referred to application, the bellows 21 and 26 co-act to hold a pressure in line 35 which is a function of the nozzle pressure. Under steady state conditions, the pressure in the line 35 is due to the bellows 26. Under transient conditions, the bellows 21 has a modifying effect. The difference between the rates of response of the bellows 21 and 26 is due to the fact that the bellows 21 is fed directly from the nozzle pressure while the bellows 26 is fed from the nozzle pressure through a restriction 38. These are details having to do with the operation of the relay. Three expedients are used to modify the transient movement in nozzle pressure due to sudden changes in the instrument indication; (1) by the throttling bellows 39 which moves the flapper 15 in the reverse direction (negative feed back) from its initial transient movement; (2) by a reset bellows 40 fed from the throttling bellows through a restriction 44 to cancel (positive feed back) the throttling bellows motion after a time delay determined by the restriction setting; (3) by a bellows 48 fed from the reset bellows and connected to the upper end of arm 8 to move the direct set pointer or follow-up lever 7 in the same direction as the sensing element thereby changing the nozzle and flapper separation in a sense opposite to the change produced by the sensing element (negative feed back). The magnitude of the response (the nozzle and flapper separation) produced by the throttling bellows 39 and the reset bellows 40 is adjustable, as hereinafter described, from zero to two or more times the magnitude of the response produced by the sensing element. The magnitude of the response of the bellows 48 is not adjustable.

The throttling bellows 39 is supplied by a line 42 branching from the transmitted pressure line 35. The action of the throttling bellows is opposed by the reset bellows 40 connected to the throttling bellows by a rod 41 and supplied from the throttling bellows through a line 43 having an adjustable restriction 44 which introduces a time lag in the equalizing of the pressure in the throttling and reset bellows. A change in pressure in the throttling bellows causes a movement of lever 45 about an adjustable pivot 46 slidable on the lever 45 and on a stationary guide 47. When the pivot is fixed at the upper end of the lever 45 the throttling bellows has no effect. When the pivot is fixed or adjusted at some intermediate point on the lever 45, the change in pressure transmitted to the throttling bellows 39 causes an initial movement of the flapper 15 in the sense to oppose the movement of the flapper by the differential lever 9. This action of the throttling bellows is only present during transient changes. As the pressures in the throttling and reset bellows equalize through the restriction 44, the flapper is returned to the position determined by the differential lever 9. Under very slow changes the throttling and reset bellows are at all times equalized and there is no compensating action induced by the throttling bellows. As the pressure builds up in the reset bellows 40, this pressure is fed through a line 49 to the bellows 48 which moves the follow up lever 6 and pointer 7 toward a position corresponding to the steady state instrument indication. Since the bellows 48 is fed directly from the reset bellows 40, the bellows 48 moves the pointer to the steady state position only as the effect of the throttling bellows is being cancelled out due to the equalization of the pressure in the bellows 39 and 40 through the restriction 44. There is, therefore, a steady state pressure corresponding to every position of the follow-up element 7. Under transient conditions, there is added to this steady state pressure a transient pressure which is the pressure across the restriction 44. This pressure is determined by the displacement necessary to restore the flapper to the nozzle. If the pivot 46 on the lever 45 is set so that a very small motion is returned to the flapper, the corresponding change in pressure must be very large. As the pivot 46 is moved down the lever 45, the transient pressure change becomes smaller. At a value of 100% throttling range the pressure is exactly equal to the difference in steady state pressure corresponding to where the follow-up lever 7 is and where it would be if it exactly matched the measurement lever 1, or to say it another way, the transient pressure plus the initial pressure is equal to the final output pressure. As the pivot 46 is moved still farther down the lever 45, the transient pressure is less than final change, so that an inverse or negative derivative action is produced by such settings.

The derivative action of the bellows 48 is adjustable in time or rate by adjustment of the restriction 44. The derivative action of the bellows 48 is not adjustable in absolute amount or magnitude, but because of the adjustment of the throttling and reset means 39, 40, by adjustment of the pivot point 46 the derivative action of the bellows 48 has a relative effect which varies to positive to negative as indicated in Fig. 2.

When the pivot point 46 is at 13, the bellows 39, 40 have no effect. Then the bellows 48 acts at a time rate determined by the restriction 44 to move the pointer 7 to a position proportional measurement. The change in transmitted pressure appearing in the line 35 due to a change in measurement is accordingly proportional to the derivative with respect to time of the change in nozzle pressure due to the change in measurement. When the pivot points 13 and 46 coincide, the derivative action is at a maximum. As the pivot point 46 is lowered, the derivative action decreases in magnitude and finally become negative.

In Fig. 2 is shown a family of curves representing the values of transmitted pressure increments as a function of time produced for different settings of the pivot point 46 which controls the throttling range. These curves show the transmitted pressure for the indicated percentages of throttling range adjustment. All of the curves at the end of T₀, determined by the adjustment of the restriction 44, merge at the level of the change in the level of instrument information appearing at instrument 1 and indicated as the step function 50. For example with 10% throttling, the transmitted pressure appearing in bellows 37 rises along line 51 to 10 times the amplitude of the change in instrument information represented by the step function 50 and then falls exponentially along the line 52 to the level corresponding to the steady state change in transmitted pressure for the change in instrument information 50. With 200% throttling, the transmitted pressure appearing in bellows 37 rises along line 51 to one-half the amplitude of the change in instrument information 50, and then gradually increases exponentially along line 57 to the level corresponding to the change in instrument information 50.

The transmitter feeds forward to the controller a signal of pressure having a derivative relationship to the change in instrument indication which is adjustable in both time and magnitude. A convenient expression for the magnitude of the derivative relationship is the derivative coefficient which is the difference between the initial response of the transmitter and the final response divided by the final response. For example, if the initial response is 100% and the final response is 100% i. e. the change in transmitted pressure equals exactly the change in the measured or controlled quantity, the derivative coefficient is zero. If the initial response is greater than 100%, the derivative coefficient is positive. If the initial response is less than 100%, the derivative coefficient is negative. The entire range of derivative coefficient is possible by adjusting the pivot point 46.

The controller is a reset type similar in construction to the transmitter except that the bellows 48 and the line 49 are eliminated and a motor 37a is substituted for the bellows 37. The motor 37a acts to change the controlled quantity in response to the difference between the pointer 3a and the direct set pointer 7a. In the controller, the corresponding parts are illustrated by the same numerals with the subscript "a." The pointer 7a in the controller is set to the desired control point and the nozzle pressure is varied by a flapper 15a which responds to the difference between the pointer 3a and the direct set pointer 7a. The nozzle pressure is fed to a relay and appears in a line 35a which feeds the motor 37a actuating a suitable control in the direction to bring the indication of the instrument 1a to the value required by the direct set pointer 7a. The relay also feeds through a line 42a the throttling bellows 39a and the reset bellows 40a which have the same effect as the corresponding bellows in the transmitter.

It should be noted that the derivative action in the transmitter is not coupled to any signal fed back from the controller. The signal is fed forward from the transmitter to the controller with no reflected feed back.

If the transmitter is set so as to have no derivative action but merely to transmit a signal equal to the measured or controlled quantity (i. e. derivative coefficient equals 0), then it is possible to obtain a derivative action by substituting the bellows 37c in Fig. 3 for the bellows 37 in Fig. 1.

The bellows 37c in Fig. 3 takes the transmitted pressure from line 35 in a housing 59 having its open end closed by inner and outer diaphragms 60, 61, the outer diaphragm for example having an area five times the area of the inner diaphragm. A common end plate 62 connected to the inner ends of the diaphragms is connected by a link 63 to the controller input lever 11a. The housing pressure is transmitted to the space between the diaphragms 60, 61 by a line 64 having an adjustable restriction 65. The final response of the diaphragms 60, 61 (after equalization of the pressure through the restriction 65) is due to the inner diaphragm 60. The initial response to a change in pressure in the line 35 is due to the area of the outer diaphragm. The bellows assembly 37c accordingly has a derivative coefficient of $$\frac{5-1}{1} = 4$$

This is a derivative response, fixed in magnitude and adjustable in time. The derivative response is fed forward to the controller with no feed back coupling. The signal fed to the controller is proportional to the signal received with the added derivative action (which in this case is positive) which informs the controller in advance of the coming change to be made.

What I claim as new is:

1. In a fluid operated control, a transmitter of the nozzle and cooperating surface type, a follow-up lever, a sensitive element for varying the relative separation of the nozzle and surface in accordance with the difference between the position of the sensitive element and the follow-up lever, a relay for producing a control pressure in accordance with the nozzle pressure, throttling means actuated by the control pressure for varying the relative separation of the nozzle and surface in a sense opposite to the variation by the sensitive element, reset means actuated by the control pressure for cancelling the throttling variation, a retarded transfer means for delaying the build up of the control pressure in the reset means, and an actuator for the follow-up lever responsive to the control pressure built up through the retarded transfer means moving the follow-up lever in the same direction as the sensitive element to thereby reduce the difference between the position of the sensitive element and the follow-up lever.

2. In a fluid operated control of the nozzle and cooperating surface type, a sensitive element having a connection for varying the relative separation of the nozzle and surface to vary the nozzle pressure in accordance with its information, a relay for producing a control pressure in accordance with the nozzle pressure, a throttling bellows actuated by the control pressure for varying the relative separation of the nozzle and surface in a sense opposite to the variation by the sensitive element, means for adjusting the percentage response of the throttling bellows, a reset bellows having a restricted connection to the control pressure opposing the action of the throttling bellows and cancelling the same at the end of the time interval determined by the restriction, and a separate means independent of the adjustment of the response of the throttling means and fed by the reset bellows pressure for varying the relative nozzle and surface position in a sense opposite to variation by the sensitive element.

3. In a pneumatic control of the nozzle and cooperating surface type, a follow-up element, a sensitive element having a connection for varying the relative separation of the nozzle and cooperating surface in accordance with the difference between the positions of the sensitive and follow-up elements, throttling means fed in proportion to the nozzle pressure for varying the relative separation of the nozzle and surface in a sense opposite to the variation by the sensitive element, reset means fed in retarded transfer relation in proportion to the nozzle pressure for cancelling the throttling variation, a sensitivity adjustment for varying the percentage effect of the throttling and reset means, and an actuator fed from the reset means and having a connection with the follow-up element independent of the sensitivity adjustment for moving the follow-up element to a position corresponding to the pressure in the reset means whereby the initial response is determined by the throttling means in proportion to the sensitivity adjustment and the final response at the end of the retarded transfer time to the reset means is determined by the actuator for the follow-up element independent of the sensitivity adjustment.

References Cited in the file of this patent

UNITED STATES PATENTS

| | | |
|---|---|---|
| 1,471,504 | Myer | Oct. 23, 1923 |
| 2,304,782 | Donaldson | Dec. 15, 1942 |
| 2,358,032 | Rothwell et al. | Sept. 12, 1944 |
| 2,360,889 | Philbrick | Oct. 24, 1944 |
| 2,431,297 | Moore | Nov. 18, 1947 |
| 2,441,405 | Fitch | May 11, 1948 |
| 2,512,561 | Ziegler | June 20, 1950 |
| 2,520,468 | Moore | Aug. 29, 1950 |
| 2,529,875 | Howard | Nov. 14, 1950 |
| 2,633,858 | Eckman | Apr. 7, 1953 |